United States Patent
Canfield et al.

(10) Patent No.: US 11,698,940 B1
(45) Date of Patent: Jul. 11, 2023

(54) CACHING ITEM INFORMATION FOR DISPLAY IN AN INTERFACE OVERLAY

(71) Applicant: Amazon Technologies, Inc., Seattle, WA (US)

(72) Inventors: Brett Patrick Canfield, Seattle, WA (US); Charles Lawrence Scott, Seattle, WA (US); Roshan Makhijani, Seattle, WA (US); Paul Phillip Mannino, Seattle, WA (US); Corey Lucius, Seattle, WA (US); Alex Michael Shipman, Rogers, AR (US); Seong Jin Park, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/204,689

(22) Filed: Mar. 17, 2021

(51) Int. Cl.
| | |
|---|---|
| *G06F 16/9535* | (2019.01) |
| *G06F 16/9538* | (2019.01) |
| *G06F 16/957* | (2019.01) |
| *G06F 3/0482* | (2013.01) |
| *G06F 9/451* | (2018.01) |
| *G06Q 30/0601* | (2023.01) |
| *G06F 16/954* | (2019.01) |

(52) U.S. Cl.
CPC ........ *G06F 16/9535* (2019.01); *G06F 3/0482* (2013.01); *G06F 9/451* (2018.02); *G06F 16/954* (2019.01); *G06F 16/9538* (2019.01); *G06F 16/9574* (2019.01); *G06Q 30/0631* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 8,117,085 | B1 * | 2/2012 | Smith | G06Q 30/0629 |
| | | | | 705/26.7 |
| 8,666,914 | B1 * | 3/2014 | Dupin | G06F 16/3346 |
| | | | | 706/12 |
| 8,887,037 | B1 * | 11/2014 | Cook | G06F 16/9577 |
| | | | | 715/204 |
| 9,470,532 | B2 | 10/2016 | Pellow | |
| 9,607,331 | B2 | 3/2017 | Hu | |
| 10,706,450 | B1 * | 7/2020 | Tavernier | G06F 16/9535 |
| 10,866,976 | B1 * | 12/2020 | Yoon | G06F 16/3334 |
| 2004/0024629 | A1 * | 2/2004 | Kirby, Jr. | G06Q 10/06 |
| | | | | 705/7.17 |

(Continued)

*Primary Examiner* — Mandrita Brahmachari
(74) *Attorney, Agent, or Firm* — Knobbe, Martens, Olson & Bear LLP

(57) ABSTRACT

Systems and methods are provided for rendering a first interface for presentation by a user computing device based on a first user input and information received over a network. The first interface can include item information. Additional item information may be stored at the user computing device at the time that the first interface is processed, but not initially displayed. Based on receiving a second user input, a second interface can be displayed that includes the additional item information, where the second interface may be displayed over a first portion of the first interface such that the first user interface remains accessible. The second interface may be populated with portions of the previously stored additional item information without necessarily obtaining further information over the network.

20 Claims, 6 Drawing Sheets

(56) References Cited

U.S. PATENT DOCUMENTS

| | | | | |
|---|---|---|---|---|
| 2004/0186840 | A1* | 9/2004 | Dettinger | G06F 16/2423 |
| 2006/0161541 | A1* | 7/2006 | Cencini | G06Q 30/02 |
| | | | | 707/999.005 |
| 2007/0226636 | A1* | 9/2007 | Carpenter | G06F 3/0482 |
| | | | | 715/751 |
| 2008/0071743 | A1* | 3/2008 | Jhaveri | G06F 16/951 |
| 2009/0007188 | A1* | 1/2009 | Omernick | H04N 21/44209 |
| | | | | 725/62 |
| 2009/0187558 | A1* | 7/2009 | McDonald | G06F 16/248 |
| | | | | 707/999.005 |
| 2010/0115396 | A1* | 5/2010 | Byron | G06F 16/954 |
| | | | | 715/234 |
| 2011/0270824 | A1* | 11/2011 | Morris | G06F 16/9038 |
| | | | | 715/830 |
| 2012/0130847 | A1* | 5/2012 | Kalin | G06Q 30/0641 |
| | | | | 705/26.7 |
| 2012/0221932 | A1* | 8/2012 | Gleadall | H04L 67/02 |
| | | | | 715/208 |
| 2017/0052976 | A1* | 2/2017 | Verma | G06F 16/24535 |
| 2018/0218431 | A1* | 8/2018 | Prendki | G06Q 30/0631 |
| 2018/0218435 | A1 | 8/2018 | Bloem | |
| 2019/0114363 | A1* | 4/2019 | Cheng | G06F 16/9558 |
| 2020/0159393 | A1* | 5/2020 | Cansino | H04N 21/41265 |
| 2020/0402147 | A1* | 12/2020 | Lin | G06F 3/04883 |
| 2021/0073271 | A1 | 3/2021 | Inoue | |
| 2021/0174426 | A1 | 6/2021 | Isaacson | |

\* cited by examiner

CACHING ITEM INFORMATION FOR DISPLAY IN AN INTERFACE OVERLAY

BACKGROUND

Retailers and merchants involved in electronic commerce often provide user interfaces from which a customer (e.g., a user, a client, etc.) may search or browse an electronic catalog for products or other items available for purchase. A customer can interact with the electronic catalog to define a query or otherwise provide user input. The query can define an item and specific features associated with the item. For example, a customer can search an electronic catalog for an Acme brand lawn mower with an XYZ brand leaf bag. Based on the query or the user input, the electronic catalog can determine a list of associated search results. For example, the electronic catalog can identify items that are similar to the requested item from the query or the user input (e.g., lawn mowers with leaf bags). The customer can further interact with the user interface in order to select particular items of the electronic catalog. For example, the customer can request additional information about a particular item (e.g., further details about the item and/or to purchase the item).

In order to enable communication with the electronic catalog, computing devices can utilize applications to view, update, and/or exchange data, for example via a communication network. Applications are usually created by software developers, who utilize coding languages to create the application. A variety of types of applications exist. For example, a desktop application can include code executable by a traditional fully-fledged operating system (e.g., a desktop or a laptop), a mobile application can include code executable on a mobile device, and a web application can include code executable in a web browser (which itself is an application executing on a device). Therefore, a user can utilize an application in order to communicate with and browse the electronic catalog.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
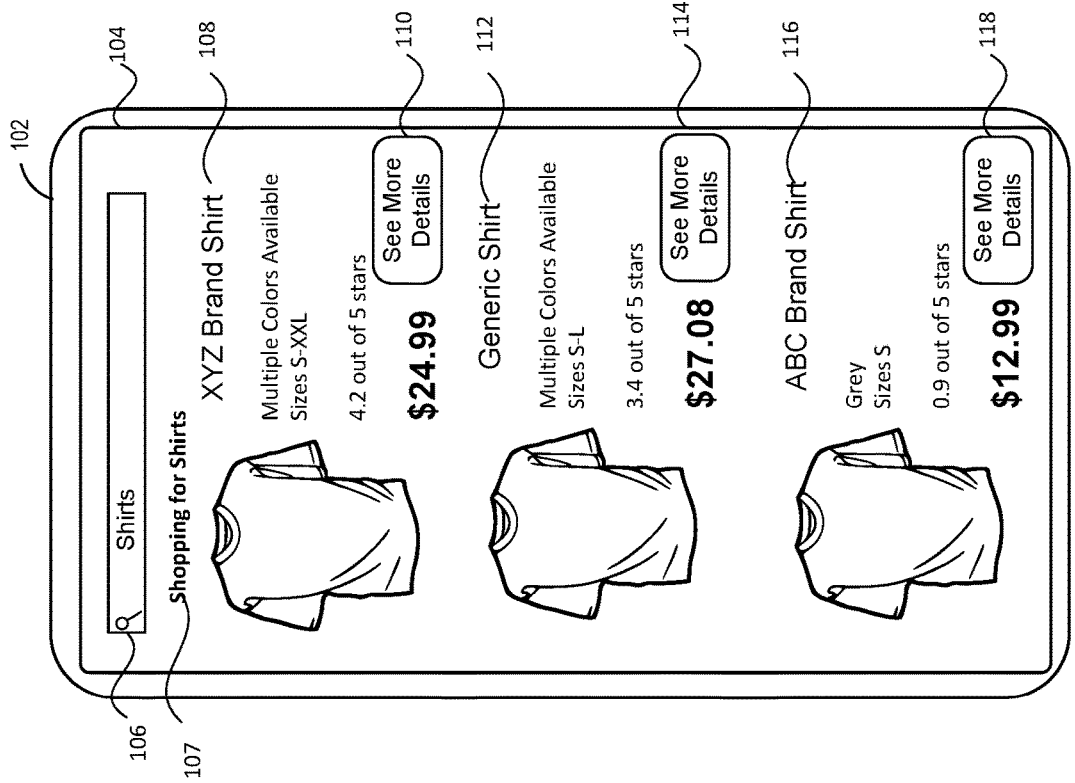
FIG. 1 depicts an example user interface presented on a mobile device in order to display particular items for browsing and preview by a user according to some embodiments.

Generally described, aspects of the present disclosure generally relate to providing item browsing and related user interface features that makes the evaluation of items more efficient by obtaining and storing additional item information prior to explicit user request. Such additional item information may be item information that is not explicitly contained within original item information and may correspond to any information that is not received as part of an initial query to a retail server or other network data source. For example, the additional item information can include additional information about a particular item that was included in the original item information. Further, the additional item information can include information about a number of items that were not included in the original item information but are related to an item that was included in the original item information. Providing the additional item information beneficially provides a user with additional information about items. For example, the additional item information can include information associated with reviews, customizable features, delivery status, price, etc. Such information can be desirable to a user as it may provide the user with information necessary to make a purchase decision or take other action with respect to a given item or set of items. For example, the user may wish to know the delivery timetable for the item before effectuating a purchasing decision. However, identification of the additional item information using existing technologies can be a time-consuming and inefficient process as the user computing device may load the additional item information each time the information is requested and may require the user to navigate away from a previously viewed user interface, thus causing the user to lose their place among other items of potential interest to the user.

Embodiments of the present disclosure enable an efficient and effective method for obtaining and storing additional item information prior to a user request for the additional item information. Obtaining and storing the additional item information may be based on primary item information. In some embodiments, the primary item information may be obtained and displayed as part of a response to an initial query by a user computing device, such as an item search request or a request to browse a category of items. In other embodiments, the primary item information may be displayed by the retail server as part of an initial interface presented to the user computing device (e.g., the primary item information may be linked to a specific uniform resource locator ("URL") or uniform resource identifier ("URI")). The primary item information may be primary, critical, basic, or otherwise premium item information. For example, the primary item information may include an initial item picture (e.g., diagram, figure, etc.), an initial item title, an initial delivery date, a rating, or any other initial item information. Based on obtaining the primary item information, the user computing device can obtain and store additional item information. The additional item information may include any non-basic, non-critical, or any other non-essential item information, depending on the embodiment. For example, the additional item information may include a plurality of item pictures, a plurality of delivery options, a plurality of reviews and/or ratings, item specifications, or any additional details about the item. The primary item information and/or the additional item information may be defined or selected in part by the user and/or an administrator.

More specifically, embodiments of the present disclosure can provide an efficient and effective method for obtaining additional item information and storing the additional item information for use in generating a subsequent interface. These embodiments can therefore generate the subsequent interface using the additional item information without reobtaining the additional item information from the retail server or other network-accessible remote data source. Based on receiving a user input (e.g., a selection of a particular item from the primary item information), the user computing device can cause display of a second interface that includes the additional item information. The user computing device may render the second interface over a first portion of the initial interface. In order to easily return to the primary item information in the initial interface, the customer can interact with a second portion of the initial interface while the second interface is being displayed. In some embodiments, the second portion of the initial interface may be represented on the display of the user computing device (such that the customer can visualize and interact with the second portion) while a portion of the initial interface is being displayed in order to provide easy access to the primary item information. This can enable the user computing device to ensure that a user does not lose their original place in the primary item information when browsing the additional item information.

In conventional systems, in obtaining item information for display in a user interface, customers shopping on a mobile computing device may obtain item information from the retail server. Further, each time a customer seeks to update the item information, the customer may need to load a completely new page with new data. The user device may obtain this data by communicating a request to the retail server and receiving the data from the retail server. As the user device is receiving data from the retail server each time the item information is updated, the user interface can be loaded in an inefficient and ineffective process. As the customer may need to obtain updated data whenever evaluating a product and making a purchase decision, the inefficiencies in obtaining the item information from the retail server can cause an increased lag. For example, a number of customers when making a purchasing decision may desire to compare multiple items. Therefore, a customer may wish to obtain additional item information about multiple items in order to evaluate and compare the items. Further, as the customer may need to access a separate page to obtain the additional information according to existing systems, this can lead to a customer losing their place in a native application (for example, not being able to easily switch back to a previously presented item list from a prior user interface), experiencing prolonged loading screens, and/or being required to interact with the native application to move between the additional item information and the primary item information. This may provide an unsatisfactory experience for customers or other users and, as a result of the inefficiencies in the traditional approach, the customer may give up and/or change computing devices.

Such a traditional approach may be particularly ineffective with respect to items that are considered likely candidates for more thorough searching or evaluation experiences (e.g., items that typically require a more in-depth decision or evaluation process by a customer before the customer makes a purchase decision). For example, high priced items (e.g., phones, televisions, cars, etc.), high variant items (e.g., clothes, books, houseware, etc.), and/or customizable items (e.g., art, food, etc.) may require a more thorough searching experience and a customer may request additional item information for many item candidates before making a decision. As each set of additional item information can lead to lag time this can lead to increased inefficiencies. Providing these customers with information about related items without causing the customer to leave an original user interface (e.g., an original search query) can be very beneficial and can increase the efficiency for the search. Further, it can be beneficial to provide a central hub that contains additional item information about a plurality of related items. Traditional physical retail stores do not typically have the ability to offer a central hub or interface that contains additional item information for browsing by the customer. Instead, the customer must browse the traditional physical retail stores in order to find items that are related to their search. Additionally, the customer may experience trouble in determining what items are actually related to the search. Further, traditional online retail stores do not typically offer a centralized hub or interface that provides additional item information about a plurality of items related to original item information. Therefore, the customer may be unable to adequately determine the additional item information.

Some aspects of this disclosure address the problems noted above, among others, by obtaining additional item information and storing the additional item information locally at a user device prior to it being requested for display. By storing the additional item information, the user computing device can load an interface with the additional item information with minimal to no load time and/or context switching. The user computing device can receive a first input (e.g., an input from a user) and provide the first input to the retail server. Based on receiving the first input, the retail server can provide the primary item information to the user computing device. The user computing device may then cause display of an interface that includes the primary item information. In addition, the user computing device can obtain additional item information associated with the first input. The user computing device can cache and/or store the additional item information in a local data cache for subsequent use. By caching the additional item information, customers can generate a request for the additional item information and receive the additional item information from the cache instead of the retail server. Caching the additional item information, beneficially provides customers with the additional item information with minimal to no load times or context switching. For example, a user computing device can cache the additional item information, receive user input, access the additional item information, and generate an interface based on this information. Such a process can be desirable to a retailer as the retailer may avoid periodically providing the additional item information to the user computing device.

In order to present the additional item information, the user computing device can receive a second input and, based on receiving the second input, the user computing device can obtain the additional item information from the local data cache. Further, the user computing device can cause the display of a second interface that contains the additional item information. The second interface may correspond to an overlay that is rendered or displayed over a portion of the first interface. For example, the second interface may be rendered over a first portion of the first interface. Further, while the second interface may be rendered over the first portion of the first interface, a second portion of the first interface may remain accessible by the customer. Therefore, based on the rendering of the second interface, both the second interface and the second portion of the first interface may be accessible by the customer. The customer can interact with the second interface in order to parse the additional item information. In some embodiments, the additional item information may correspond to a plurality of items. Further, the customer may be able to swipe or otherwise navigate through the plurality of items and the second interface may subsequently display additional item information about each item of the plurality of items. Each item may be associated with particular available actions such as "Add to Cart" and/or "Buy Now" actions. Each action may be represented by a button or other selectable option that is displayed within the second interface. Therefore, the second interface can distill the essential information for a particular item and provide the information as additional item information to the customer via the user computing device.

FIG. 1 depicts an example user interface 104 presented on a mobile device (e.g., a user computing device) 102 in order to display particular items for browsing and preview by a customer. The example user interface 104 is illustrative of an interface that the retail server generates and presents to a customer when interacting with the retail server. In the example of FIG. 1, the user interface 104 includes a number of shirts (which is one example of items) and associated item information. It will be understood that FIG. 1 is illustrative only, and a retail server may offer any type or combination of items desired by the customer, such as groceries, clothing, office supplies, training services, etc. In some embodiments, items may include digital items (such as an electronic book or a movie that is deliverable over the Internet for presentation on the user device), physical items (such as to be shipped to the customer upon purchase) or services (such as a service to be provided remotely or in person to the customer). The user interface 104 may be presented to a customer in order to provide access to item information managed by a retail server that may be presented in different contexts. The user interface 104 may be presented in response to, for example, a search query that is input to a user computing device 102 or an input of a URL or URI to the user computing device 102. In the illustrated example, the user interface 104 may be presented in response to the input of a search query for "shirts." The user interface 104 may be displayed via a native application operating upon a user computing device 102 utilized by a customer. In some embodiments, the customer may have previously logged into a customer account maintained for the customer by the retail server and the user interface 104 may be based at least in part on the customer account.

The user computing device 102 may communicate with a retail server in order to obtain information associated with a one or more items. The user computing device 102 may receive input indicating a search query from a customer (e.g., "shirts"). The search query may be input to a search bar or search field 106 by the customer. Based on receiving the search query, the user computing device 102 can transmit the search query to the retail server. The user computing device 102 may subsequently receive primary item information associated with one or more items from the retail server. The primary item information may be search query results, which may include a list or set of items. In some embodiments, the primary item information may not be in response to a search query. Further, the primary item information may be provided to the user computing device 102 based on the user computing device 102 navigating to a specific page (e.g., via a URL or URI). The primary item information may include popular item information, most purchased item information, suggested item information, etc. and may be provided to the user computing device 102 based on the user computing device 102 navigating to a specific page (e.g., a retailer's home web page) or a particular user interface within an application. Further, the user computing device 102 can also receive additional item information corresponding to the search query from the retail server. The user computing device 102 may store the additional item information in a data cache of the user computing device 102.

The retail server may determine the additional item information to be sent to the user computing device 102 and stored in the data cache. The additional item information may correspond to the primary item information. The primary item information may include item information for each of a plurality of items. For example, the primary item information may include primary information such as a cost, a title, an image, etc. The additional item information may include additional item information for each of the plurality of items that is not present in the primary item information. For example, the additional item information may include additional information such as ratings, shipping options, unboxing videos, etc. In some embodiments, the primary item information may include item information for a first plurality of items and the additional item information may include item information for a second plurality of items related to the first plurality of items. For example, if the primary item information includes item information for XYZ brand items, the additional item information may include item information for ABC brand items that are related to the XYZ brand items. In other embodiments, the additional item information may include additional item information for the first plurality of items and item information for a second plurality of items. The retail server may select the additional item information to send to the user computing device based on particular criteria (e.g., a sampling policy). The additional item information may be predetermined or may be dynamically selected in response to the primary item information. For example, the additional item information may be item information for a predetermined subset of the plurality of items corresponding to the primary item information (e.g., the first five items). Further, the additional item information may be dynamically selected based on a user's search history, activity, or other interactions with the retail server. The number of items included in the additional item information may be based on the criteria and may be predetermined or dynamically selected. Therefore, the user computing device 102 can obtain the primary item information from the retail server.

Based on the primary item information that has been received from the retail server, the user computing device 102 can generate and/or cause display of a first interface 104 (e.g., the user interface 104). The first interface 104 may be displayed on the user computing device 102. Further, the first interface 104 can identify one or more items from the primary item information. In the example of FIG. 1, the first interface 104 identifies a first item 108, a second item 112, and a third item 116. The first interface 104 can further include a plurality of additional elements. For example, the first interface 104 can include the search bar 106, a search identifier 107, the first item 108, a first item selector 110, a second item 112, a second item selector 114, a third item 116, and a third item selector 118. Therefore, the user computing device 102 can cause the display of the first interface 104 that identifies the primary item information.

A customer may interact with the search bar 106 to enter a new search and cause the user computing device 102 to conduct a new search. For example, the customer can input a search for "long sleeve shirts." In response, the user computing device 102 can provide the search to the retail server and update the first interface. In some embodiments, the customer can interact with the search bar 106 to clarify or filter the search. For example, the customer may elect to filter the current search results based on price (e.g., remove results that cost over $25). Therefore, the customer can interact with the search bar 106.

The first interface 104 may include a search identifier 107 that identifies the current search being implemented. In the example of FIG. 1, the search identifier 107 identifies the current search as "Shopping for Shirts." Such an identifier may help a user to quickly see their relative position or place in a larger shopping or browsing experience.

The first interface 104 may further display one or more items from the primary item information. The user computing device 102 may sort, rank, filter, etc. the one or more items based on particular factors. For example, the user computing device 102 or retailer server may rank the items based on availability, price, delivery date, reviews, etc. A top ranked item may be placed in a particular position of the first interface 104 (e.g., in a topmost position of the first interface). The first interface 104 identifies a first item 108, a second item 112, and a third item 116 and identifies item information for each item from the primary item information. For example, for each item, the first interface 104 identifies a picture of the item, a title of the item, particular customizations of the items (e.g., sizes, colors, etc.), a rating, a price, etc. The first interface 104 may display all of the primary item information. In other embodiments, the first interface may display a subset of the primary item information. It will be understood that the first interface 104 can identify more, less, or different primary item information. In the example of FIG. 1, the first interface 104 identifies the item "XYZ Brand shirt" with options "Multiple Colors Available" and "Sizes S-XXL," ranking "4.2 out of 5 stars," and price "$24.99;" item "Generic shirt" with options "Multiple Colors Available" and "Sizes S-L," ranking "3.4 out of 5 stars," and price "$27.08;" and item "ABC Brand shirt" with options "Grey" and "Sizes S," ranking "0.9 out of 5 stars," and price "$12.99." Further, the first interface 104 may include a first item selector 110, a second item selector 114, and a third item selector 118. A customer may interact with one or more of the item selectors 110, 114, or 118 to obtain the additional item information.

Figure 2:
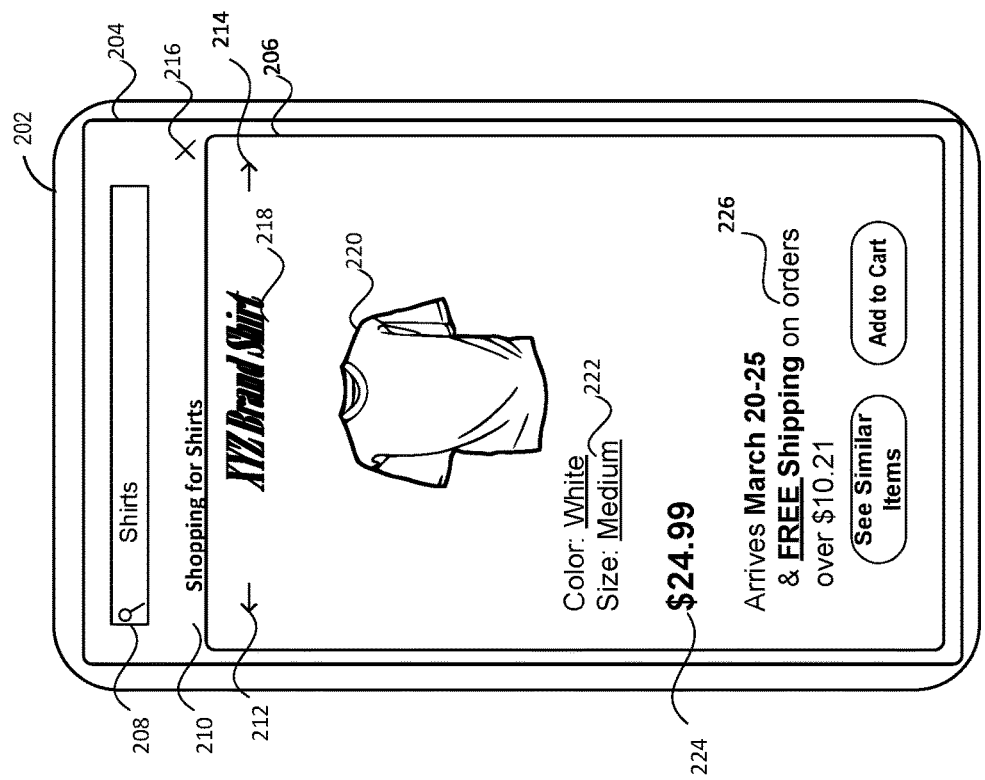
FIG. 2 depicts an example user interface presented on a mobile device, where the user interface includes an overlay rendered over a portion of the original interface according to some embodiments.

FIG. 2 depicts an example plurality of user interfaces presented on a mobile device 202 (e.g., a user computing device), where the plurality of user interfaces includes an overlay rendered over a portion of the original interface according to some embodiments. The example plurality of user interfaces is illustrative of a plurality of interfaces that the retail server generates and presents to a customer. A second user interface 206 of the plurality of user interfaces may be presented to a customer based upon determining that the customer has interacted with one or more of the item selectors 110, 114, or 118 from FIG. 1. Based upon this determination, the user computing device 202 may obtain additional item information from a data cache of the user computing device 202. The user computing device 202 may then cause the second interface 206 to be displayed that contains the additional item information. Further, the user computing device 202 may obtain the additional item information without communicating with the retail server as the additional item information is stored in the data cache.

Based upon receiving user input corresponding to a particular item from the primary item information, the user computing device 202 may communicate with a data cache (e.g., a memory, a local data store, etc.) in order to obtain the additional item information associated with the primary item information. For example, the memory (e.g., one or more registers) may be a location of short term data storage. In some embodiments, the memory may include one or more of primary memory, secondary memory, cache memory, or any other type of short term data storage. Further, the local data store may be a location of long term data storage. In some embodiments, the local data store may include one or more of a hard disk drive ("HDD"), a solid-state drive ("SSD"), a secure digital ("SD") card, or any other type of long term data storage. The data cache may be local to the user computing device 202 and the additional item information may be locally stored. Therefore, the user computing device 202 may obtain the additional item information without recommunicating with the retail server (e.g., communicating again after obtaining the primary item information). The additional item information may include information not represented in the primary item information. The additional item information may include detailed information such a potential delivery period, offers, coupons, etc. Therefore, the user computing device 202 can receive the additional item information from the data cache.

Based on the additional item information that has been received from the data cache, the user computing device 202 can generate and/or cause display of a second interface 206. The second interface 206 may be displayed on the user computing device 202. Further, the second interface 206 can identify one or more items from the additional item information. The one or more items identified by the second interface 206 can correspond to the one or more selectors 110, 114, or 118 selected by the user in FIG. 1. In the example of FIG. 2, the second interface 206 identifies an item. The item may correspond to the first item as seen in FIG. 1. The second interface 206 can further include a plurality of additional elements. For example, the second interface 206 can include item toggle buttons 212 and 214, an exit button 216, an item title 218, an item picture 220, item options 222, an item price 224, and/or item delivery criteria 226. It will be understood that the second interface 206 can include more, fewer, or different elements.

The second interface 206 may be displayed over a portion of a first interface 204. The first interface 204 may correspond to the initial interface as seen in FIG. 1. In some embodiments, the second interface 206 may be displayed over the entire first interface 204. A first portion of the first interface 204 may be covered by the second interface 206 and a second portion of the first interface 204 may not be covered by the second interface 206. The second portion of the first interface 204 may include one or more elements. For example, the second portion of the first interface 204 can include the search bar 208 and/or a search identifier 210 that identifies the current search being implemented. In the example of FIG. 1, the search identifier 210 identifies the current search as "Shopping for Shirts." It will be understood that the second portion of the first interface 204 can include more, fewer, or different elements. While the second interface 206 is displayed over the first portion of the first interface 204, the second portion of the first interface 204 may remain visible by the user (e.g., the user computing device 202 may still illustrate the second portion of the first interface 204). Further, the second portion of the first interface 204 may be functional while the second interface 206 is displayed over the first portion of the first interface 204 such that the user can interact with the second portion of the first interface 204. For example, a user can interact with the search bar 208 to enter a new search and cause the user computing device 202 to execute the new search. Therefore, the second interface 206 can be displayed over a portion of the first interface 204.

The second interface 206 may include item toggle buttons 212 and 214. The user can interact with item toggle buttons 212 and 214 to modify the item represented in the second interface. For example, by interacting with an item toggle button 212 or 214, a new item based on the additional item information can be presented in the second interface 206 by reading the data from the data cache. Further, the user can interact with an item toggle button 212 or 214 such that a previously view item in the second interface 206 is uploaded to the second interface 206. Therefore, the item toggle buttons 212 and 214 can enable the user to cycle through one or more items based on the additional item information. In some embodiments, a certain number of items in either navigation direction (e.g., back or forward) may have their associated additional information cached in advance of the second interface being requested for display by the user, such that the item information for a new item is displayed immediately in response to user selection of toggle button 212 or 214 without requiring any network request to necessarily be sent by the device 202.

The second interface 206 can include an exit or close button 216. A user can interact with the exit button 216 to exit the second interface 206. Based on interacting with the exit button 216, the user computing device may remove the second interface 206 such that the first portion of the first interface 204 and the second portion of the first interface 204 are displayed (e.g., the first interface 204 is displayed, which may appear as the user interface shown in FIG. 1). The user computing device 202 may exit from the second interface 206 and provide the first interface 204 without obtaining data from the retail server. Further, as the second portion of the first interface 204 and the second interface 206 are being displayed concurrently, the user computing device 202 may update the interface shown to be the first interface in an efficient, near-zero latency manner. Therefore, the user can interact with the exit button 216 to exit the second interface 206.

The second interface 206 may identify an item title 218, an item picture 220, item options 222, an item price 224, and/or item delivery criteria 226. In the example of FIG. 2, the item title 218 is "XYZ Brand shirt," the item options 222 are set to "White" and "Medium," the item price 224 is "$24.99," and the item delivery criteria 226 is "Arrives March 20-25 & Free Shipping on orders over $10.21." The second interface 206 may include additional buttons. For example, the second interface can include a "See Similar Items" button or selectable option that when interacted with, causes additional items related to the current item to be shown and an "Add to Cart" button or selectable option that, when interacted with, causes the item to be added to a customer's shopping cart. The second interface 206 may provide these additional elements for each item based on the use of the item toggle buttons 212 and 214. This can enable a customer to quickly and efficiently browse items, see similar items, and add items to a cart while retaining access to the first interface 204 (e.g., the second portion of the first interface 204 is displayed and the customer can interact with the second portion of the first interface 204). Further, the second interface 206 may provide focused information such that the user may need to use minimal to no scrolling to peruse the focused information as it may be shown in an initial display of the second interface 206. Further, the second interface 206 may include an additional button (a "see full details" button in the illustrated embodiment) that causes presentation of additional detail about the particular item. Therefore, the second interface 206 can provide the additional item information to the user while retaining user access to the first interface 204.

The second interface 206 may be implemented by caching additional information (e.g., metadata) associated with the plurality of items displayed in a first interface 204. A native data client may cache the additional information and the additional information may be made ready for display upon user input with the first interface 204 (e.g., a user tapping on a product). One or more of the first interface 204 or the second interface 206 may include a selection of items based on an intent of a user. The intent of the user can be identified through services and algorithms that analyze a user's prior interactions (e.g., a user's prior shopping actions). For example, the services and algorithms may include a customer intent identification service, a customer actions logging, a customer reviews database, etc.

In some embodiments, the user computing device may implement the first interface 204 and/or the second interface 206 in a web browser (e.g., implemented in HTML) and the first interface 204 and/or the second interface 206 may not be implemented in a dedicated application. For example, the second interface may be cached in a cache of the web browser. In order to implement the first interface 204 and/or the second interface 206 in the web browser, the website browser may make parallel (e.g., concurrent) calls or requests (e.g., via asynchronous requests) for the item information and the additional item information from the retail server. Further, the information may be obtained in batches (e.g., a plurality of additional information can be obtained). For example, the additional information that is initially hidden may be stored as one or more objects in a Document Object Model (DOM) in order to cache it for later display. The web browser may then inject the additional item information into a template for the second interface 206. In this or similar manners, the first interface 204 and the second interface 206 may be implemented via a web browser.

Figure 3:
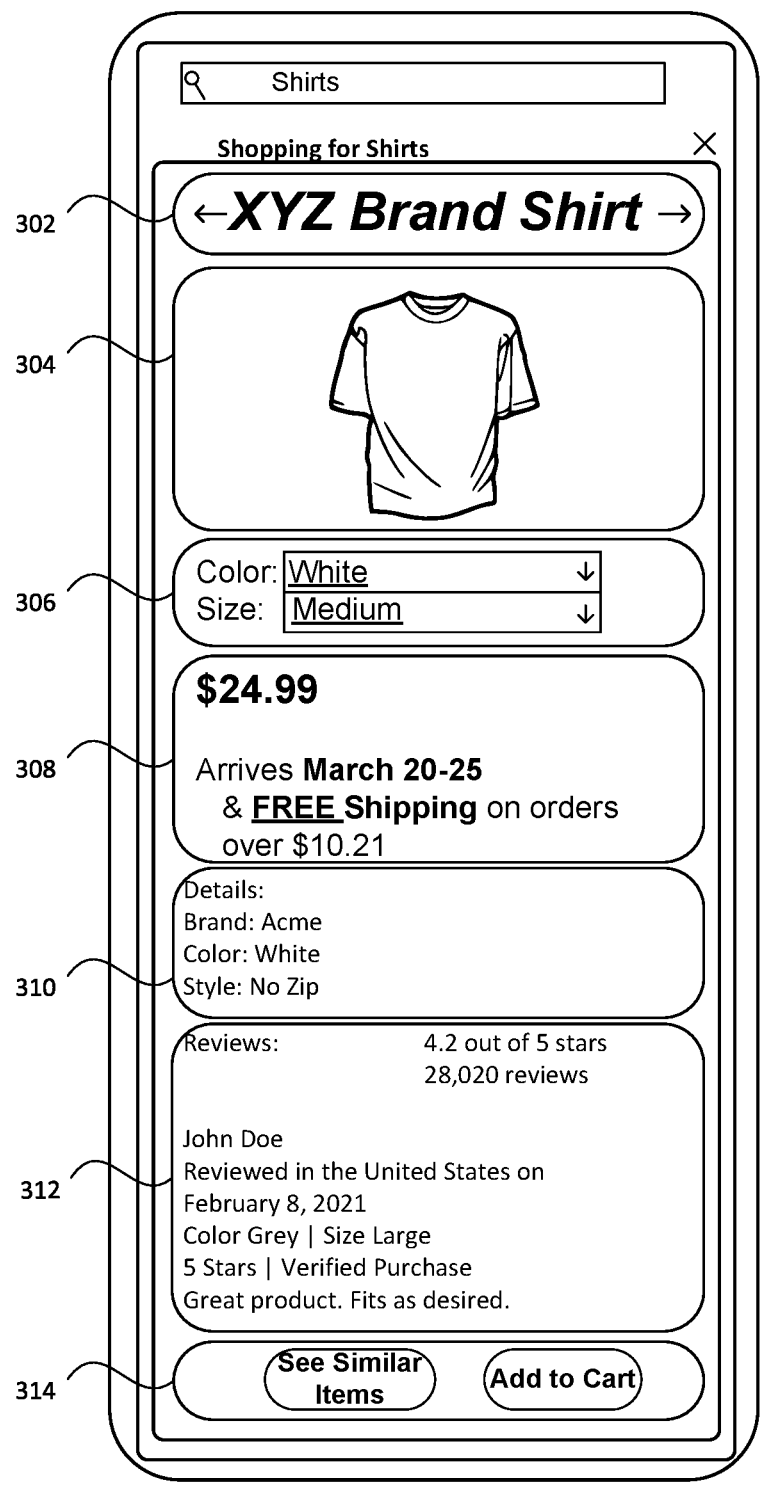
FIG. 3 depicts an example user interface presented on a mobile device, where the overlay of the user interface is segmented into a plurality of blocks according to some embodiments.

FIG. 3 depicts an example plurality of user interfaces presented on a mobile device, where an overlay over the user interface is segmented into a plurality of blocks according to some embodiments. The example plurality of user interfaces may include a portion of a first interface (e.g., the first interface 204 of FIG. 2) and a second interface (e.g., the second interface 206 of FIG. 2). The second interface may include a plurality of elements associated with a particular item and based on additional item information obtained from a data cache. For example, the second interface can include a title 302, an image 304, customizable options (e.g., drop down menus or other options to configure different variations of an item) 306, price and delivery 308, item details 310, customer reviews 312, and/or action buttons 314. It will be understood that the second interface can include more, less, or different elements.

The title 302 may include a title of the item. Further, the title 302 may include a link to the full detail page. By interacting with the link to the full detail page, the user computing device may obtain the full detail for the item from the retail server. The title 302 may further include item toggle buttons that enable the user to toggle between items based on the additional item information obtained from the data cache. In the example of FIG. 3, the title 302 is "XYZ Brand Shirt."

The image 304 may include an image of the item. In some embodiments, the image 304 may include a plurality of images associated with the item and the second interface may include toggle buttons that enable a user to toggle between the plurality of images. Further, the image 304 may include an image of review stars associated with the item. For example, an average star rating of the item may be included. Further, the average star rating may link to a review page of the item.

The customizable options 306 may include one or more customizable options. The user may be able to interact with the customizable options 306 in order to customize the item. For example, the customizable options 306 can include a color, a size, a quantity, etc. In the example of FIG. 3, the customizable options 306 are "color" and "size" with "color" set to "white" and "size" set to "medium." Based on user interactions with the customizable options 306, one or more elements of the second interface may be updated. For example, by selecting a different size, the price of the item may be updated.

The price and delivery 308 may include one or more of the delivery speed of the item, a price of the item, a delivery promise or guarantee, an order by date and/or a sell by date, offers and/or coupons, or an availability. Further, the price and delivery 308 may include multiple delivery and pricing options. For example, a faster delivery time may correspond to a higher price. In the example of FIG. 3, the price and delivery 308 includes "$24.99 Arrives March 20-25 & FREE Shipping on orders over $10.21."

The item details 310 may identify one or more details of the item. The item details 310 may identify attributes of the item. The attributes of each item may depend on the type of item, the quantity of item, or any other information associated with an item. For example, the item details 310 may identify one or more of a brand, a color, a style, a color, fabric, item specifications (e.g., a voltage rating), or any other item information. The specific types of item information shown may depend upon a type or category of the item, and/or may depend on what types of item details the user is likely to be interested in based in part on the user's browsing history, preferences or other data. For example, a tent item may have closure attribute (e.g., zipper or closure) and a shirt item may have a different attribute such as a style attribute (e.g., v neck). In the example of FIG. 3, the item details 310 includes "Details: Brand: Acme Color: White Style: No Zip."

The customer reviews 312 may identify an average rating or review of the item. Further, the customer reviews 312 may identify one or more reviews. For example, the customer reviews 312 can identify a top review (e.g., a most liked review, a most helpful review, etc.). In some embodiments, the customer reviews 312 may be scrollable. In the example of FIG. 3, the customer reviews 312 includes "Reviews: 4.2 out of 5 stars 28,020 reviews John Doe Reviewed in the United States on Feb. 8, 2021 Color Grey Size Large 5 Stars Verified Purchase Great product. Fits as desired."

The action buttons 314 may identify one or more actions that the user can take with regards to the item. For example, the action buttons 314 can include an "add to cart" button, a "buy now" button, and/or a "see similar items" button. In some embodiments, the second interface may be scrollable by the customer and one or more of the action buttons 314 may remain in a fixed position while the user scrolls the second interface (e.g., the action buttons 314 may be continuously shown in the second interface while a portion of the second interface is scrolled). In the example of FIG. 3, the action buttons 314 includes a "see similar items" button and an "add to cart" button. It will be understood that the action buttons 314 can include more, less, or different buttons.

Figure 4:
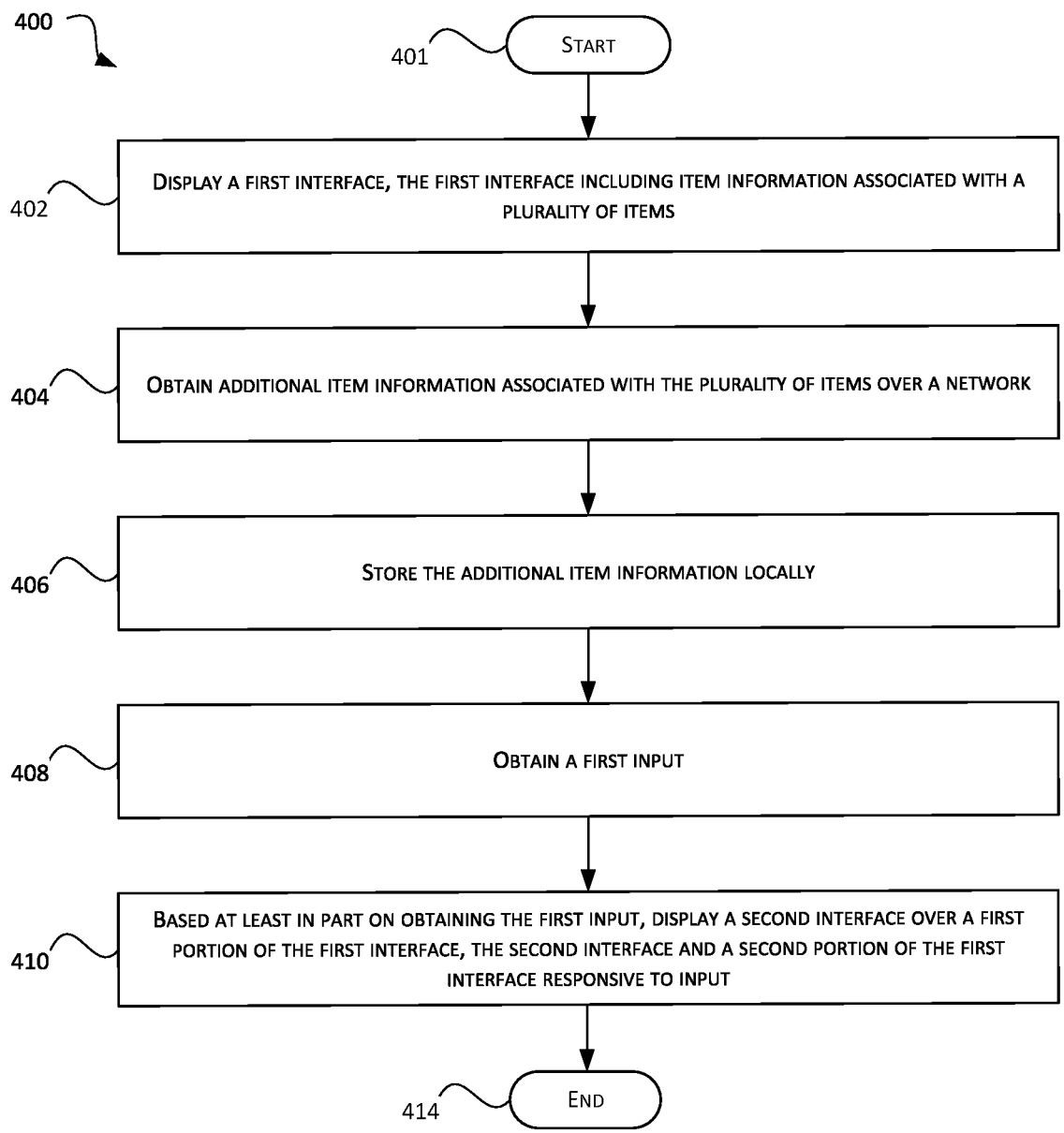
FIG. 4 depicts an example workflow for generating a second interface and rendering the second interface over a portion of a first interface.

FIG. 4 shows a method 400 executed by a user computing device 102 as seen in FIG. 1, according to some examples of the disclosed technologies. The user computing device 102 may be a mobile computing device (such as a smartphone or tablet), a laptop, wearable smart technology, or any other computing devices.

In a step 402, the user computing device 102 may display a first interface including item information associated with a plurality of items. Prior to displaying the first interface, the user computing device 102 can implement or execute a software application previously installed on the device, which may be a dedicated application developed by an operator of the retailer server discussed herein. Based on implementing the software application (e.g., a software application native to the user computing device 102, a native application, etc.), the user computing device 102 can obtain an input (e.g., user input) associated with a query. Prior to obtaining the input, the user computing device 102 can store a template within the software application. The template may have been included within the application at the time of installation, provided as part of a periodic update of the application's data or code, or provided from the retail server during a current user session. The template may be populated with the additional item information to generate the second user interface. Based on the input, the user computing device 102 can communicate with a retail server (e.g., a network-accessible source) to obtain the item information via a network (e.g., execute the query to generate query results). The item information may identify a plurality of items from a data store associated with the retail server based on the query. Further, the first interface may be populated with the item information (e.g., the query results) and may be responsive to a first input. The first interface may be displayed in the native application Therefore, the user computing device 102 can display a first interface including item information associated with a plurality of items.

In a step 404, the user computing device 102 may obtain additional item information associated with the plurality of items over the network. The user computing device 102 can obtain the additional item information via the network. As discussed above, the user computing device 102 may not initially display the additional item information in the first interface.

In a step 406, the user computing device 102 can store the additional item information locally. The user computing device 102 can store the additional item information in local data storage (e.g., a data cache, which may be in ROM or RAM of the user computing device, in some embodiments). Based on storing the additional item information, the user computing device 102 can generate cached item information. The user computing device 102 may further store additional item information for each of one or more of the plurality of items. Therefore, the user computing device 102 can store the additional item information locally.

In a step 408, the user computing device 102 can obtain a first input. The first input may include a user's selection of an item of the plurality of items from the first user interface based on the item information. For example, as discussed with respect to examples above, the user may select a particular item from a list of item search results that the user is interested in reviewing in more detail.

In a step 410, the user computing device 102 can, based at least in part on obtaining the first input, display a second interface (e.g., an overlay) over a first portion of the first interface The second interface and a second portion of the first interface may be responsive to input (e.g., an interaction with a button of the second interface and/or a button of the first interface). For example, the second portion of the first interface and the second interface may be simultaneously displayed and configured to accept user selections. In some embodiments, the item information originally presented in the first interface (at step 402 above) may correspond to a first plurality of items and the additional item information may correspond to the first plurality of items and/or a second plurality of items (e.g., the additional item information may identify suggested items, similar items, items that users also purchased, or other items). The additional item information may identify additional information associated with the first plurality of items. For example, if the first plurality of items corresponds to lawn mowers, the item information may include information such as a price, a delivery date, a rating, etc. for each item and the additional item information may include additional information such as reviews, delivery options, media, etc. The additional item information may identify a second plurality of items related to the first plurality of items. For example, if the first plurality of items corresponds to walk-behind lawn mowers, the second plurality of items may correspond to riding lawn mowers. Further, if the first plurality of items corresponds to lawn mowers, the second plurality of items may correspond to leaf blowers. The second interface and the second portion of the first interface may be visible by the user. The second interface may be displayed over the first portion of the first interface in the native application. Further, the second interface may be customizable. The user computing device 102 may customize the second interface based at least in part on one or more of a customer, the plurality of items, or the user computing device 102. Further, the first portion of the first interface may be irresponsive to input.

In some embodiments, the second interface may be populated with the cached item information based on obtaining the second user input and without obtaining item information corresponding to the cached item information from any remote data store over the network. The second interface may include one or more navigation controls. The one or more navigational controls may include carousel navigation controls and/or swipe controls as discussed above. Further, the user computing device 102 can display additional item information associated with a first item of the plurality of items in the second interface. For example, the user computing device 102 may display one or more pages associated with the plurality of items. The user computing device 102 can receive one or more navigational inputs based on the one or more navigation controls and update the second interface to display additional item information associated with a second item of the plurality of items (e.g., one or more different pages) based at least in part on the one or more navigational inputs.

Figure 5:
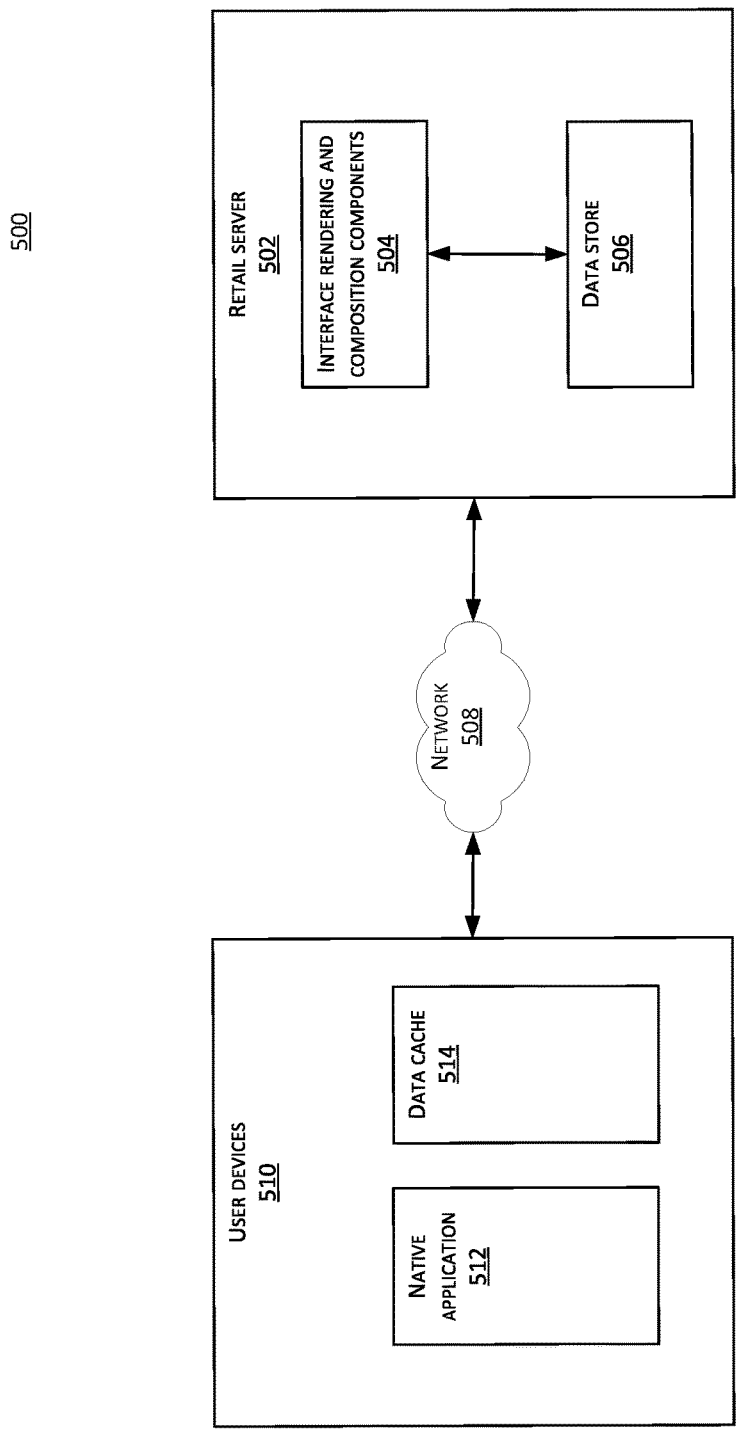
FIG. 5 is a block diagram depicting an illustrative operating environment for presenting users with an interface that includes item information, caching additional item information, and causing a second interface to be displayed that includes the additional item information.

FIG. 5 is a block diagram depicting an illustrative operating environment 500 for presenting customers with an interface that includes item information, caching additional item information, and causing a second interface to be displayed that includes the additional item information. The illustrative operating environment shown in FIG. 5 includes a retail server 502 that is in communication with user devices 510.

In the illustrated embodiment, the retail server 502 may communicate with various user devices, such as a user computing device 510, via network 508 to provide item information and additional item information. The retail server 502 may include generating text and/or graphics, which may be organized as a page or user interface using hypertext transfer or other protocols in response to requests received from the various user devices. User interface data or page data that is generated in response to user requests may be generated using a combination of various components and systems (e.g., the interface rendering and composition components 504). In some embodiment, the retail server 502 can include a data store 506 to store item information.

Item data stored in data store 506 may include any information related to each of a large number of items, such as those items available from an electronic catalog. For example, item data may include, but is not limited to, price, availability, title, item identifier, item feedback (e.g., user reviews, ratings, etc.), item image, item description, item attributes, keywords associated with the item, etc. In some embodiments, the data store 506 or another data store accessible to the retail server may store user data associated with users of the retail service, such as purchase history, browsing history, item reviews and ratings, user preferences, location information, activity information, etc. Item attributes stored in the data store 506 for individual items may include, for example, price, size, color, manufacturer, weight, and/or many others. It will be appreciated that some item attributes may be specific to a given item type. Item attributes for a book, for example, may include book title, author, publisher and page count, while item attributes for an item of clothing may include size, color, designer, gender, etc. Stored item attribute data, in some embodiments, may include both item attribute types and associated item attribute values for a specific item. For example, the "Fabric Type" item attribute type for a given item, such as running shoes, may have an associated item attribute value of "leather."

The interface rendering and composition components 504 may generally be responsible for retrieving or receiving data from various sources to assemble into a user interface, page, audio presentation data or other content to be sent to a user device 510 for presentation. It will be appreciated that the sources of page content accessed by the interface rendering and composition components 504 may include sources not illustrated in FIG. 5, depending on the embodiment. For example, the interface rendering and composition components 504 may be in communication with an item catalog system (e.g., that provides information regarding items available for purchase), a data store that stores user data (such as user account information, payment information, etc.), and/or other retail-related systems and components known in the art.

User computing devices 510 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, smart speaker (with or without a display screen), kiosk, augmented reality device, other wireless device, set-top or other television box, and the like. User devices 510 may communicate with the retail server 502 via a communication network 508, such as the Internet or other communications link. The network 508 may be any wired network, wireless network or combination thereof. In addition, the network 508 may be a personal area network, local area network, wide area network, cable network, satellite network, cellular telephone network, etc. or combination thereof. For example, the network 508 may be a publicly accessible network of linked networks, possibly operated by various distinct parties, such as the Internet. In some embodiments, the network 508 may be a private or semi-private network, such as a corporate or university intranet.

The network 508 may include one or more wireless networks, such as a Global System for Mobile Communications (GSM) network, a Code Division Multiple Access (CDMA) network, a Long Term Evolution (LTE) network, or some other type of wireless network. The network 508 may use protocols and components for communicating via the Internet or any of the other aforementioned types of networks. The user computing devices 510 can include a data cache to store additional item information. Further, the user computing devices 510 can include a native application through which the interfaces are displayed.

Figure 6:
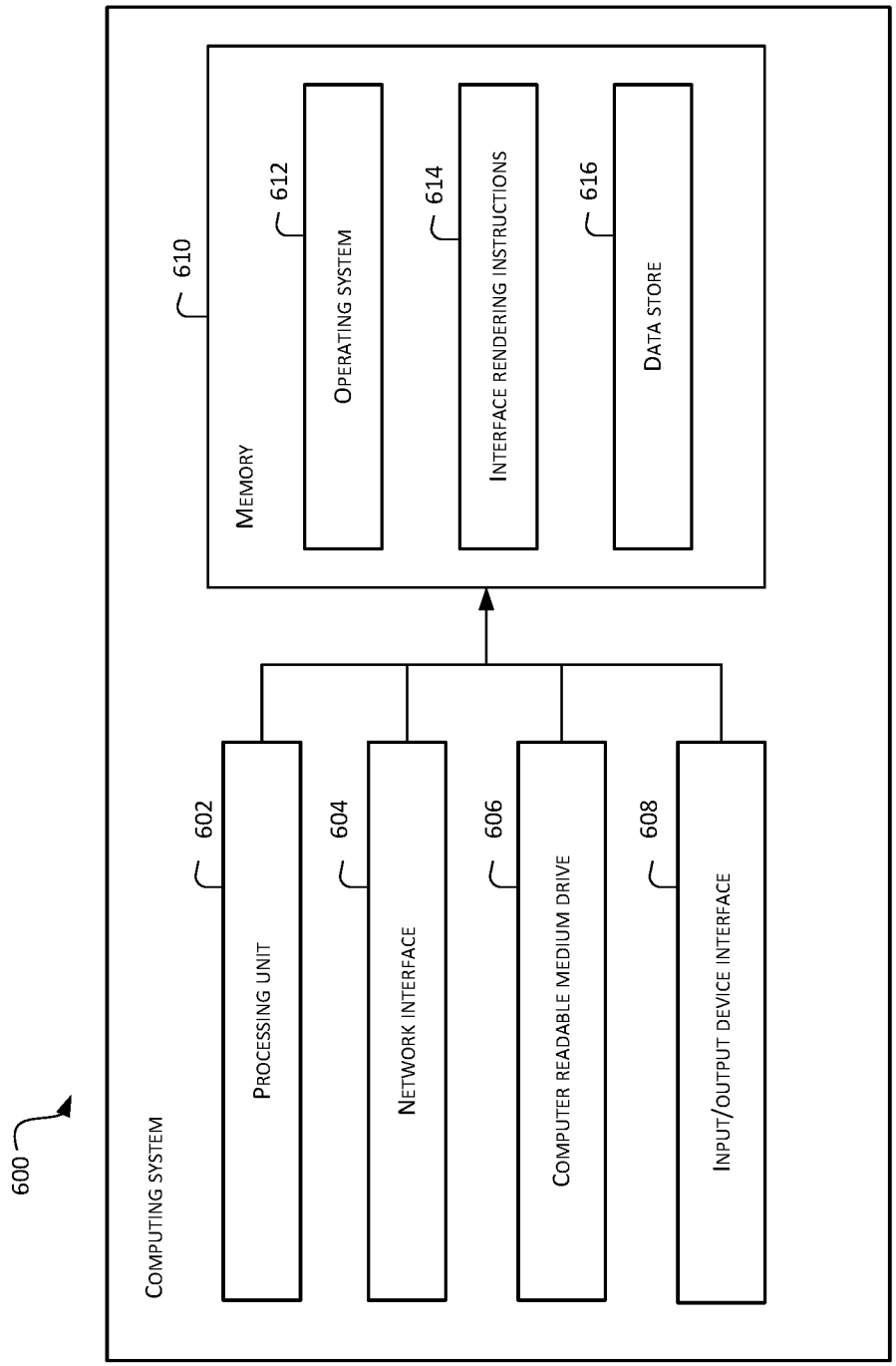
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an input/output ("IO") interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include interface rendering instructions 614. As another example, the computer-readable memory 610 may include a data store 616.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electronically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A mobile computing device, the mobile computing device comprising:
    memory; and
    a processor communicatively coupled to the memory and configured to:
        execute, on the mobile computing device, a software application associated with a network-accessible source of item information;
        obtain, within the software application, a first user input associated with a query to search the network-accessible source;
        obtain, via a network, item information identifying a plurality of items from the network-accessible source based at least in part on the query;
        display a first user interface based at least in part on obtaining the first user input, wherein the first user interface is populated with the item information;
        obtain, via the network, additional item information identifying an additional plurality of items from the network-accessible source, wherein the additional item information is not included for display within the first user interface and is requested via the network prior to any user input being received with respect to the first user interface, wherein the additional item information is based on a set of criteria separate from the query, wherein each item of the plurality of items is associated with a particular subset of the additional item information and a particular subset of the additional plurality of items;
        cache the additional item information to generate cached additional item information, wherein the additional item information is cached locally by the mobile computing device in at least one of the memory or a local data store;
        obtain a second user input, wherein the second user input comprises a selection of an item of the plurality of items from within the first user interface; and
        based at least in part on obtaining the second user input, display a second user interface over a first portion of the first user interface such that a second portion of the first user interface remains visible, wherein the second portion of the first user interface and the second user interface as simultaneously displayed are each configured to accept user selections, wherein a particular subset of the cached additional item information associated with the item is identified for display via the second user interface based at least in part on the selection of the item, wherein the second user interface is populated with the particular subset of the cached additional item information based at least in part on obtaining the second user input and without obtaining further item information over the network.

2. The mobile computing device of claim 1, wherein the particular subset of the cached additional item information identifies a first item of the additional plurality of items.

3. The mobile computing device of claim 1, wherein the second user interface comprises one or more navigation controls, wherein the processor is further configured to:
    display additional first item information associated with a first item of the additional plurality of items via the second user interface;
    obtain one or more navigational inputs based at least in part on the one or more navigation controls; and
    display additional second item information associated with a second item of the additional plurality of items via the second user interface based at least in part on the one or more navigational inputs.

4. The mobile computing device of claim 1, wherein the processor is further configured to:
    prior to obtaining the first user input, store a template within the software application, wherein the template is populated with the particular subset of the cached additional item information to generate the second user interface.

5. A computer-implemented method comprising:
    displaying a first interface, wherein the first interface is populated with item information associated with a plurality of items, wherein the first interface is responsive to a first input, wherein the item information is received via a network from a network-accessible source, wherein the item information is based on a first set of criteria;
    obtaining additional item information identifying an additional plurality of items, wherein the additional item information is not included for display within the first interface, wherein the additional item information is requested via the network from the network-accessible source prior to any user input being received with respect to the first interface, wherein the additional item information is based on a second set of criteria different from the first set of criteria, wherein each item of the plurality of items is associated with a particular subset of the additional item information and a particular subset of the additional plurality of items;

storing the additional item information to generate stored additional item information;

obtaining the first input, wherein the first input comprises a selection of an item of the plurality of items from within the first interface; and based at least in part on obtaining the first input, displaying a second interface over a first portion of the first interface, wherein a second portion of the first interface and the second interface are simultaneously displayed and configured to accept user selections, wherein a particular subset of the stored additional item information associated with the item is identified for display via the second interface based at least in part on the selection of the item, wherein the second interface is populated with the particular subset of the stored additional item information based at least in part on obtaining the first input and without obtaining further item information over the network.

6. The computer-implemented method of claim 5, wherein the second interface is customizable, the computer-implemented method further comprising:

customizing the second interface based at least in part on one or more of a user, the plurality of items, or a mobile computing device.

7. The computer-implemented method of claim 5, wherein displaying the second interface over the first portion of the first interface comprises displaying one or more pages associated with the additional plurality of items, the computer-implemented method further comprising:

displaying an updated page of the one or more pages in response to the user selections.

8. The computer-implemented method of claim 5, wherein displaying the first interface comprises displaying the first interface in a native software application, and wherein displaying the second interface over the first portion of the first interface comprises displaying the second interface over the first portion of the first interface in the native software application.

9. The computer-implemented method of claim 5, further comprising:

executing a software application associated with a network-accessible source of item information; and obtaining, within the software application, query results associated with a query to search the network-accessible source of item information, wherein the query results correspond to the first input;

wherein displaying the first interface comprises displaying the first interface populated with the query results.

10. The computer-implemented method of claim 5, wherein storing the additional item information comprises storing the additional item information in at least one of memory or a local data store, wherein the at least one of the memory or the local data store is local to a mobile computing device.

11. The computer-implemented method of claim 5, wherein the second interface comprises one or more navigation controls, wherein the one or more navigation controls comprise one or more of carousel navigation controls or swipe controls, the computer-implemented method further comprising:

displaying additional first item information associated with a first item of the additional plurality of items via the second interface;

obtaining one or more navigational inputs based at least in part on the one or more navigation controls; and displaying additional second item information associated with a second item of the additional plurality of items via the second interface based at least in part on the one or more navigational inputs.

12. The computer-implemented method of claim 5, the computer-implemented method further comprising:

prior to displaying the first interface, storing a template within a native software application, wherein the template is populated with the particular subset of the stored additional item information to generate the second interface.

13. Non-transitory computer-readable media comprising computer-executable instructions that, when executed by a computing system, cause the computing system to:

display an interface, wherein the interface is populated with item information corresponding to an item, wherein the interface is responsive to a first input, wherein the item information is received via a network from a network-accessible source, wherein the item information is based on a first set of criteria;

obtain additional item information identifying an additional item, wherein the additional item information is obtained via the network from the network-accessible source, wherein the additional item information is based on a second set of criteria different from the first set of criteria, wherein the item is associated with a particular subset of the additional item information and the additional item;

store the additional item information to generate stored additional item information;

obtain the first input, wherein the first input comprises an interaction with the interface; and based at least in part on obtaining the first input, display an overlay over the interface, wherein the overlay and a first portion of the interface are simultaneously displayed and configured to accept user selections, wherein a particular subset of the stored additional item information associated with an item is identified for display via the overlay based at least in part on selection of the item via the interaction with the interface, wherein the overlay is populated with the particular subset of the stored additional item information based at least in part on obtaining the first input and without obtaining further item information over the network.

14. The non-transitory computer-readable media of claim 13, wherein the overlay is customizable, the non-transitory computer-readable media further comprising further computer-executable instructions that, when executed by the computing system, cause the computing system to:

customize the overlay based at least in part on one or more of a user, the item, or a mobile computing device.

15. The non-transitory computer-readable media of claim 13, wherein displaying the interface comprises displaying the interface on a mobile computing device, and wherein displaying the overlay over the interface comprises displaying the overlay over the interface on the mobile computing device.

16. The non-transitory computer-readable media of claim 13, wherein displaying the overlay over the interface comprises displaying one or more pages associated with the additional item, the non-transitory computer-readable media further comprising further computer-executable instructions that, when executed by the computing system, cause the computing system to:

display an updated page of the one or more pages in response to the user selections.

17. The non-transitory computer-readable media of claim 13, wherein the overlay comprises a button, wherein at least one of the user selections comprises an interaction with the button.

18. The non-transitory computer-readable media of claim 13, wherein displaying the interface comprises displaying the interface in a native software application, and wherein displaying the overlay over the interface comprises displaying the overlay over the interface in the native software application.

19. The non-transitory computer-readable media of claim 13, the non-transitory computer-readable media further comprising further computer-executable instructions that, when executed by the computing system, cause the computing system to:

execute a software application associated with a network-accessible source of item information; and obtain, within the software application, query results associated with a query to search the network-accessible source of item information, wherein the query results correspond to the first input;

wherein displaying the interface comprises displaying the interface populated with the query results.

20. The non-transitory computer-readable media of claim 13, wherein storing the additional item information comprises storing the additional item information in at least one of memory or a local data store, wherein the at least one of the memory or the local data store is local to the computing system.

* * * * *